(12) United States Patent
Cox et al.

(10) Patent No.: US 6,932,512 B2
(45) Date of Patent: Aug. 23, 2005

(54) AGRICULTURAL ROCKSHAFT BEARING BLOCK STRUCTURE AND WEAR INSERTS THEREFOR

(75) Inventors: Philip David Cox, Polk City, IA (US); James Franklin Bierl, West Des Moines, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/084,531

(22) Filed: Feb. 27, 2002

(65) Prior Publication Data

US 2003/0161561 A1 Aug. 28, 2003

(51) Int. Cl.$^7$ .............................................. F16C 43/02
(52) U.S. Cl. ..................................................... 384/434
(58) Field of Search ................................ 384/276, 282, 384/283, 294, 297, 428, 429, 432, 434, 437, 626; 414/703

(56) References Cited

U.S. PATENT DOCUMENTS

| | | | | | |
|---|---|---|---|---|---|
| 1,391,886 A | * | 9/1921 | Fritz | ............................ | 384/626 |
| 1,736,998 A | * | 11/1929 | Darrach | ........................ | 384/626 |
| 2,082,944 A | * | 6/1937 | Evans | ........................... | 384/294 |
| 3,071,419 A | * | 1/1963 | Lower et al. | ................. | 384/295 |
| 3,096,578 A | * | 7/1963 | Sample | ........................ | 164/69.1 |
| 3,576,353 A | * | 4/1971 | Barker et al. | ................ | 384/430 |
| 3,586,187 A | * | 6/1971 | Wright | ......................... | 414/428 |
| 3,721,461 A | * | 3/1973 | Nelsen et al. | ................... | 172/1 |
| 3,929,395 A | * | 12/1975 | Stojek | .......................... | 384/432 |
| 4,209,209 A | * | 6/1980 | Stark | ............................. | 384/432 |
| 4,216,975 A | * | 8/1980 | Schafer | ........................ | 172/439 |
| 4,270,813 A | * | 6/1981 | Wiggins | ...................... | 384/431 |
| 4,488,826 A | * | 12/1984 | Thompson | ................... | 384/288 |
| 4,704,038 A | * | 11/1987 | Bruchon, Jr. | ................ | 384/443 |
| 4,799,690 A | * | 1/1989 | Gabriele | ...................... | 277/500 |
| 4,845,817 A | * | 7/1989 | Wilgus | .................. | 29/898.054 |
| 4,856,366 A | * | 8/1989 | Nikolaus | ...................... | 74/605 |
| 4,930,910 A | * | 6/1990 | Mori et al. | ................... | 384/276 |
| 5,017,022 A | * | 5/1991 | Ruggles et al. | ............. | 384/100 |
| 5,169,244 A | * | 12/1992 | Siebert et al. | ............... | 384/276 |
| 5,315,954 A | * | 5/1994 | Richmond | ................. | 116/67 R |
| 5,688,054 A | * | 11/1997 | Rabe | ............................ | 384/295 |
| 5,727,885 A | * | 3/1998 | Ono et al. | .................... | 384/294 |
| 5,733,049 A | * | 3/1998 | Shimmell | ..................... | 384/434 |
| 6,100,809 A | * | 8/2000 | Novoselsky et al. | ......... | 340/682 |
| 6,213,221 B1 | | 4/2001 | Lewallen | ...................... | 172/776 |
| 6,280,091 B1 | * | 8/2001 | Martin et al. | ................ | 384/296 |

OTHER PUBLICATIONS

Pages 46, 49 and 63 of the John Deere 726 Mulch Finisher Parts Catalog dated Apr. 9, 1998.
Page 15–4 of the John Deere 726 Mulch Finisher Operators Manual, date—unknown.

* cited by examiner

Primary Examiner—Thomas R. Hannon

(57) ABSTRACT

A bearing block structure for an implement rockshaft includes a two-piece ultra high molecular weight (UHMW) polyethylene wear insert located between a cast iron or welded steel bearing block and a rockshaft. In one embodiment, identical insert halves are supported in corresponding insert cavities in the bearing block sections, and a small thin clip is secured between the sections to prevent relative rotation between the insert halves and the bearing block. In another embodiment, a stop member projects into the cavities to prevent rotation of the insert halves.

16 Claims, 3 Drawing Sheets

US 6,932,512 B2

AGRICULTURAL ROCKSHAFT BEARING BLOCK STRUCTURE AND WEAR INSERTS THEREFOR

FIELD OF THE INVENTION

The present invention relates generally to bearing block assemblies for large rotating tubular members such as agricultural implement rockshafts and, more specifically, to wear insert structure for such assemblies.

BACKGROUND OF THE INVENTION

Round steel rockshafts of tubular or solid cross section are commonly utilized to control height on implement frames and disk gang attachments. Bearing block assemblies typically support the shaft from a frame, and a hydraulic cylinder applies a turning moment which causes the rockshaft to rotate and raise and lower the frame or gang. The bearing block assemblies usually include a two-piece cast iron or welded steel bearing block which allow rotation about an axis but limit movement in the direction of the axis. As the rockshaft rotates, often under very heavy loading, wear occurs between the steel rockshaft and the metallic bearing block. Although the bearing blocks often include a grease fitting for lubrication to reduce the wear, the hostile operating environment results in contamination of the lubricant with dust and sand which accelerates the wear. To purge the contaminants from between the rockshaft and bearing block, frequent over-greasing is required to discharge the contaminants. This greasing process is often inconvenient because of the location of the assemblies in hard to reach areas and is time-consuming and messy.

A further problem inherent with most bearing block assemblies for large applications such as agricultural implement lift systems is one of manufacturing tolerances of the shafts and of the cast iron or welded steel bearing blocks. A loose or sloppy fit between the mating parts resulting from the tolerances, combined with excessive wear that is commonly encountered in the hostile operating environment, can result in functional problems for the lift systems.

SUMMARY OF THE INVENTION

It is therefore an object of the present invention to provide an improved bearing block structure which overcomes most or all of the aforementioned problems. It is another object of the present invention to provide such a structure which is particularly useful for lift systems on agricultural implements which operate under heavy loads and in severe environmental conditions.

It is a further object of the present invention to provide an improved bearing block structure for an implement which has an increased wear life and which eliminates lubrication requirements. It is another object to provide such a structure which provides an improved fit between mating parts to reduce joint looseness.

It is yet another object of the present invention to provide an improved bearing block structure for the lift system of an implement or the like and insert structure therefor which is simple and inexpensive in construction and easy to assemble and repair. It is another object to provide insert structure which is easy to install and repair and which has improved wear characteristics.

In accordance with the above objects a bearing block structure is provided having a two-piece ultra high molecular weight (UHMW) polyethylene wear insert located between a cast iron or welded steel bearing block and a rockshaft. In one embodiment, identical insert halves are supported in corresponding insert cavities in the bearing block sections, and a small thin clip is secured between the sections to prevent relative rotation between the insert halves and the bearing block. In another embodiment, a stop member projects into the cavities to prevent rotation of the insert halves. The stop member may be an end wall of a cavity.

The bearing block structure is relatively inexpensive and easy to assemble and repair. The wear insert provides a low friction wear surface which eliminates need for frequent greasing of inconveniently located bearing areas and which has an extensive wear life, even in the hostile environment of a heavy agricultural tillage or planting implement.

These and other objects, features and advantages of the present invention will become apparent to one skilled in the art from the following description taken in view of the drawings.

DESCRIPTION OF THE PREFERRED EMBODIMENT

Figure 1:
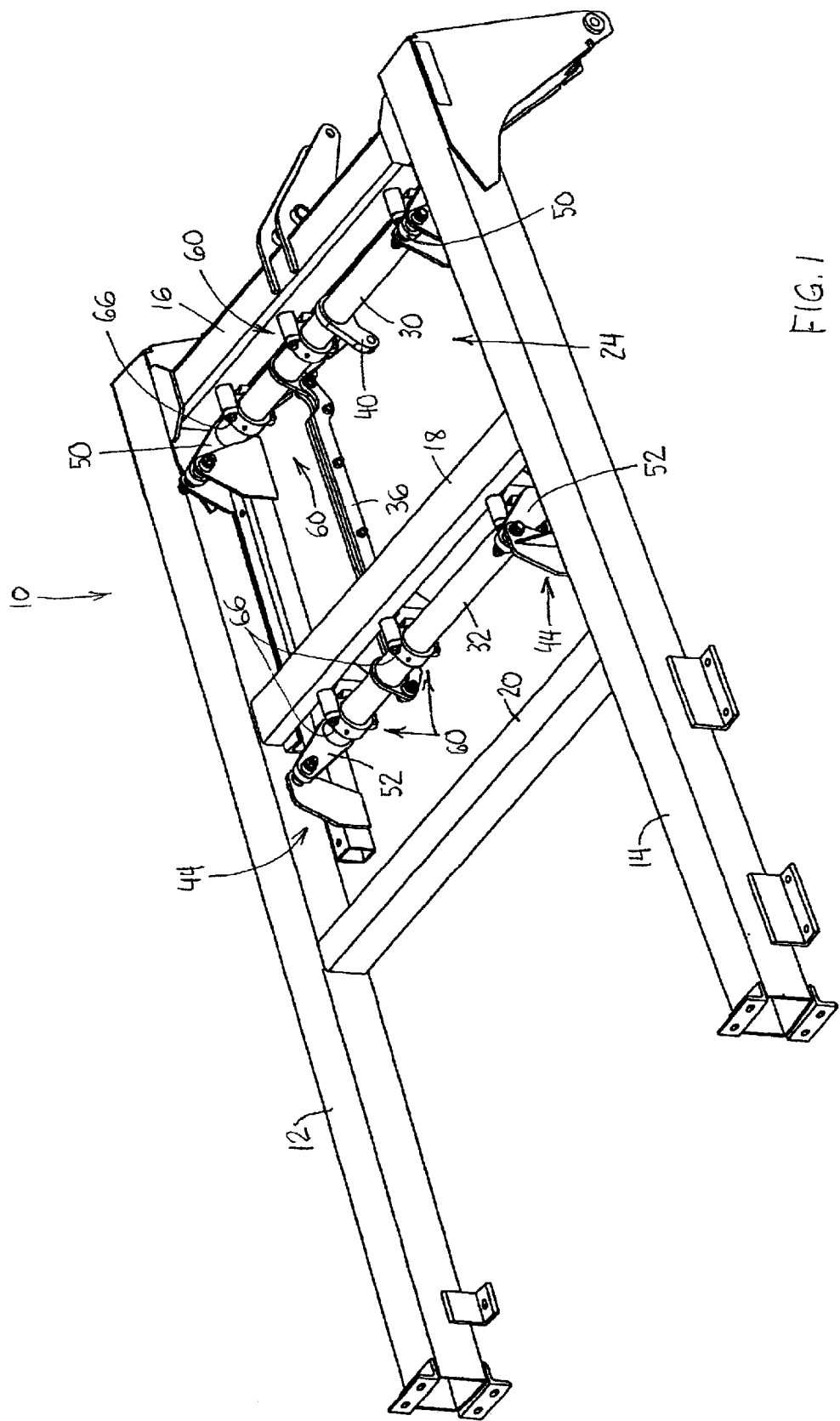
FIG. 1 is a side perspective view of a portion of an agricultural implement having a rockshaft supported by bearing block structure.

Referring to FIG. 1, therein is shown a portion of an implement frame 10 including fore-and-aft extending upper tubular members 12 and 14 and transverse connecting tubular member 16, 18 and 20. An implement lift system is shown generally at 24 and includes first and second tubular rockshafts 30 and 32 supported from the transverse members 16 and 18 and connected for operation in unison by a linkage 36. A conventionally operated hydraulic cylinder (not shown) is connected between the frame 10 and a rockshaft arm 40 to rotate the rockshafts 30 and 32 about their transverse axes. As shown in FIG. 1, lift frame structure 44 is connected through rockshaft arms 50 and 52 to the rockshafts 30 and 32, respectively, to raise and lower the structure. Earthworking tools may be carried by the frame structure 44 for vertical adjustment relative to the implement frame 10 and the ground. The lift frame structure 44 is shown by way of example only and alternatively, a rockshaft may be connected to a conventional lift wheel assembly for raising and lowering the entire frame 10 relative to the ground.

Figure 2:
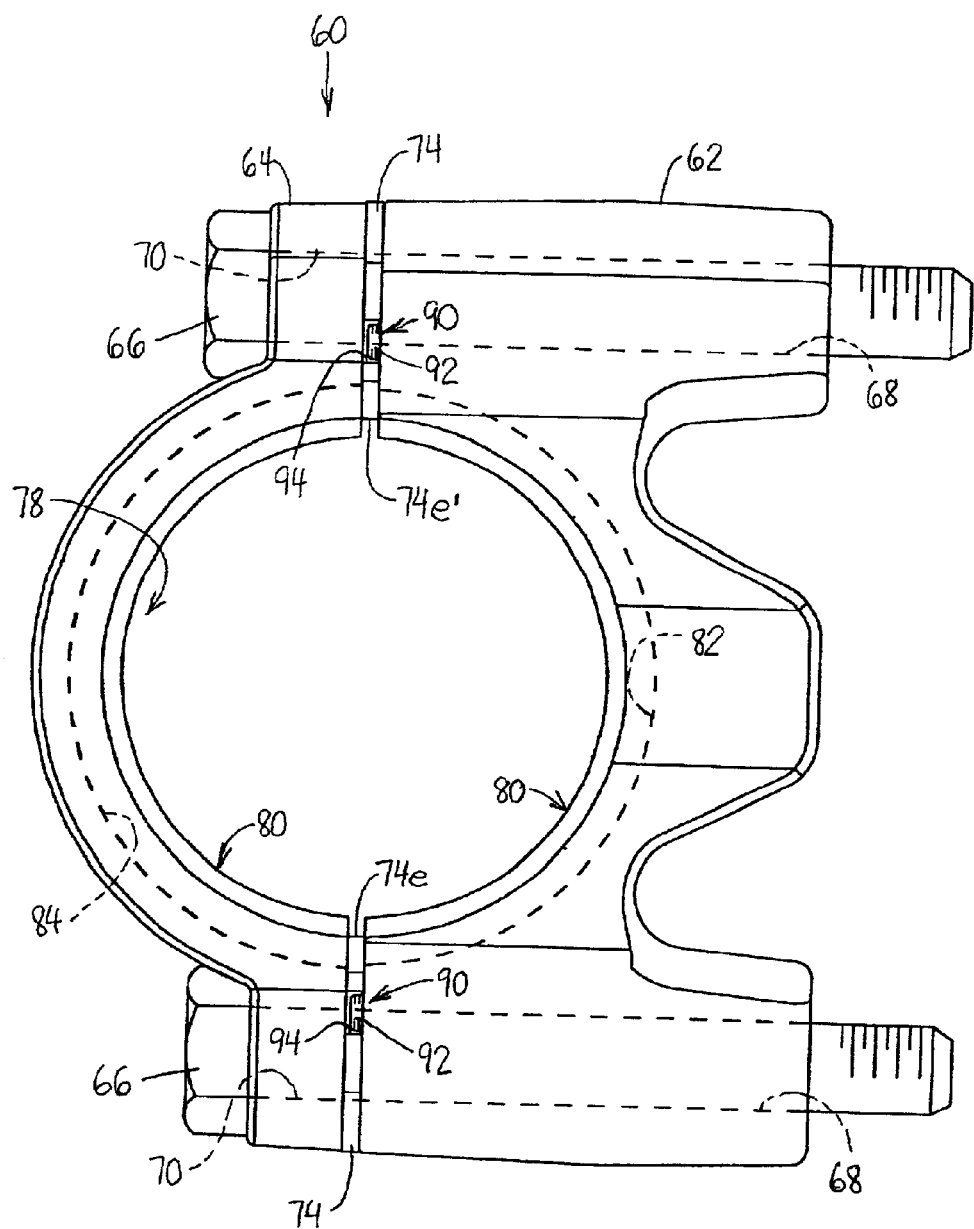
FIG. 2 is an enlarged side view of the bearing block structure shown in FIG. 1.

The rockshafts 30 and 32 are rotatably supported from the frame 10 at several locations by bearing block structures indicated generally at 60. The bearing block structure 60 includes a first or bottom portion 62 (FIGS. 2 and 3) which abuts a supporting portion of the frame 10 and a second or top portion 64 secured relative to the first portion 62 by a pair of connection bolts 66 which pass through aligned bores 68 and 70 and through the supporting portion. Insert anti-rotation or clip structure 74 is sandwiched between the portions 62 and 64 as the bolts 66 are tightened in the supporting portion. As best seen in FIG. 2, the portions 62 and 64 when assembled against the clip structure 74 define a circular rockshaft-shaft receiving opening 78. Wear insert structure 80 is supported within cavities 82 and 84 and projects radially inwardly from the opening to provide a replaceable wear-resistant and low friction bearing surface for the rockshaft.

Figure 3:
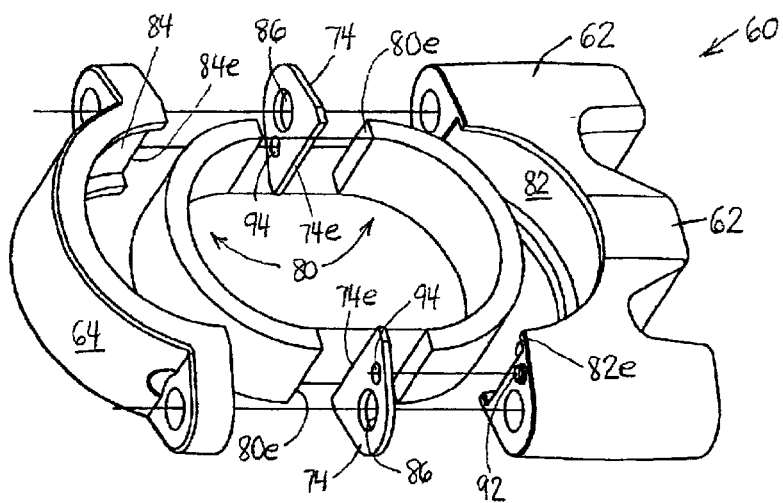
FIG. 3 is a perspective exploded view of the bearing block structure of FIG. 2.

In the embodiments shown in FIGS. 2 and 3, the cavities 82 and 84 are arc-shaped and extend completely around the inner surface of the sections 62 and 64 so that the ends (82e and 84e) of the cavities are open. The open ends facilitate casting of the sections 62 and 64. However, it is highly desirable to prevent relative rotation between the wear insert structure 80 and the cavities 82 and 84 so that relative rotation only occurs between the rockshaft and the insert structure 80. The anti-rotation structures 74 provide this function by projecting radially inwardly over the ends 82e and 84e. The structures 74 include radially inwardmost edges (74e) which are straight and extend generally parallel to the axis of the rockshaft supported by the bearing block structures 60. The structures 74 are apertured at 86 to align with the bores 68 and 70 to receive the mounting bolts 66. Indexing structure 90 prevents the structures 74 from rotating from the position shown with the edges 74e generally lying along the boundary of the opening 78 in the bearing block structure 60.

The edges 74e preferably are supported radially outwardly of the inside surfaces of the wear insert structure 80 (see FIG. 2) to prevent contact of the structures 74 with the rockshaft. However, an edge (see 74e' in FIG. 2) may be extended slightly radially inwardly beyond the surface of the bearing blocks to provide rockshaft contact with the clip prior to the insert being completely worn away so that the clip contacts the rockshaft to provide an audible wear warning. The indexing structure 90 assures that the structure 74 does not rotate about the axis of the bolt 66 and, as shown in FIGS. 2 and 3, includes a projection 92 cast into one of the sections 62 and 64 and received within an aperture 94 in the structure 74.

The insert structure 80 is preferably fabricated from ultra high molecular weight (UHMW) polyethylene and conforms generally to the shape of the corresponding cavities 82 and 84. The radially innermost surfaces of the structures 80 project inwardly from the edges of the cavities (FIG. 2) to prevent metal-to-metal contact between the rockshaft and the bearing block structure 60. To define a substantially circular opening when the insert structures 80 are assembled in the bearing block structure, each of the structures is slightly less than a complete semi-circle to accommodate the anti-rotation structure 74.

The split wear insert structure 80 simplifies assembly of the structure 80 in supportive relationship with the rockshaft. The structure 80 can be replaced when worn without completely dismantling the lift frame structure 44. By providing identical half-sections generally conforming to the surface of a half cylinder, the wear insert structure 80 is relatively easy and inexpensive to fabricate and reduces the number of components that have to be stocked.

Figure 4:
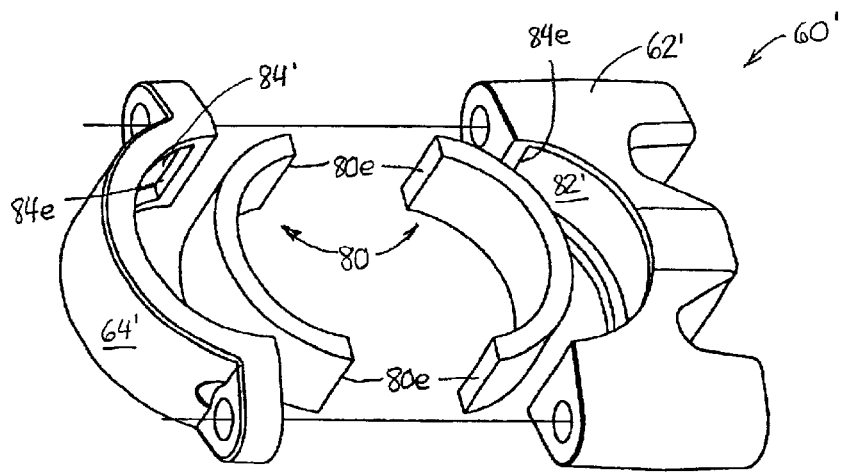
FIG. 4 is a perspective exploded view similar to that of FIG. 3 but showing an alternate embodiment of the bearing block structure.
Figure 5:
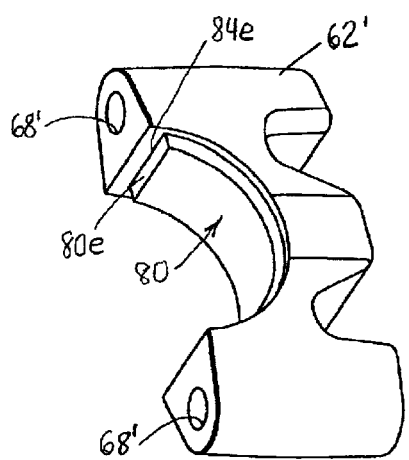
FIG. 5 is a perspective view of one section of the bearing block structure of FIG. 4 with an insert positioned in the cavity.

It is to be understood that other structure may be utilized to provide contact areas and non-rotatably index the inserts relative to the bearing block structure. For example, in the embodiment shown in FIGS. 4 and 5, cavities 82' and 84' are close-ended. Ends 84e of the cavities abut the ends 80e of the insert structure 80 and define the anti-rotation structure to prevent turning of the inserts in the bearing blocks.

Having described the preferred embodiment, it will become apparent that various modifications can be made without departing from the scope of the invention as defined in the accompanying claims.

What is claimed is:

1. Rockshaft bearing block structure for rotatably mounting implement lift structure including rockshaft having circular cross-section on an implement frame, the rockshaft bearing block structure comprising:

first and second bearing block sections, the sections including first and second arc-shaped cavities;

first and second arc-shaped bearing block inserts received in the respective first and second arc-shaped cavities;

anti-rotation structure projecting radially inwardly from the bearing block sections between the cavities and contacting end portions of the bearing block inserts, thereby preventing substantial relative sliding movement between the inserts and the cavities; and connector structure securing the first and second bearing block sections and the inserts around the rockshaft, wherein the connector structure includes bolts extending through the bearing block sections and sandwiching the first bearing block section between the second bearing block structure and the implement frame, the bolts removable to facilitate removal and replacement of the bearing block inserts without need to dismount the implement lift structure from the implement frame.

2. The structure of claim 1 wherein the anti-rotation structure comprises a clip sandwiched between the bearing block sections.

3. The structure of claim 2 wherein the connector structure includes a bolt sandwiching the clip between bearing block sections.

4. The structure of claim 2 wherein the clip comprises a planar member and the bearing block sections include indexing structure preventing movement of the clip relative to the bearing block sections.

5. The structure of claim 4 wherein the indexing structure comprises a projection on one of the bearing block sections.

6. The structure of claim 1 wherein the bearing block inserts are identical.

7. The structure of claim 1 wherein the bearing block inserts each have a half cylinder shape.

8. The structure of claim 7 wherein the inserts are identical and fabricated from a wear-resistant polyethylene material.

9. The structure of claim 1 wherein the anti-rotation structure includes a cavity end portion.

10. An implement lift structure for an agricultural implement frame including a rockshaft, a rockshaft bearing block structure for rotatably mounting the rockshaft to the implement frame, the bearing block structure including first and second bearing block sections with first and second cavities, and wear insert structure comprising;

first and second bearing block inserts having outer surfaces complimentary to the first and second cavities and adapted for support therein, the bearing block inserts including inner surfaces defining a substantially cylindrical rockshaft bearing wear area when the inserts are supported in the cavity; and wherein the bearing block inserts include a contact area adapted for non-rotatably indexing the inserts relative to the bearing block structure, and further including connector structure securing the first bearing block section to the second bearing block section and against the implement frame, the connector structure releasable to facilitate placement of the bearing block inserts in the cavities without need to dismount the implement lift structure from the implement frame.

11. The wear insert structure as set forth in claim 10 further comprising anti-rotation structure located within the cavities, the anti-rotation structure including a surface engaging the contact area thereby preventing substantial relative sliding movement between the bearing block inserts and the cavities.

12. The wear structure as set forth in claim 11 further comprising anti-rotation structure adapted for support between the bearing block sections within the cavities and having an edge defining an insert wear warning device providing an audible signal when the inserts wear to a preselected level.

13. The wear insert structure as set forth in claim 10 wherein the bearing block inserts comprise identical half portions each conforming to the shape of a half cylinder.

14. The wear structure as set forth in claim 13 wherein the contact area comprises an end portion of the half portions.

15. The wear structure as set forth in claim 13 wherein the bearing block inserts have a shape conforming to and non-rotatably received in the first and second cavities.

16. The wear structure as set forth in claim 13 wherein the inserts are fabricated from a polyethylene material.

\* \* \* \* \*